United States Patent
Kaufman et al.

(10) Patent No.: US 10,255,712 B2
(45) Date of Patent: Apr. 9, 2019

(54) ANIMATION USING KEYFRAMING AND PROJECTED DYNAMICS SIMULATION

(71) Applicant: Adobe Inc., San Jose, CA (US)

(72) Inventors: Daniel M. Kaufman, Seattle, WA (US); Jovan Popovic, Seattle, WA (US); Yunfei Bai, San Jose, CA (US)

(73) Assignee: Adobe Inc., San Jose, CA (US)

( * ) Notice: Subject to any disclaimer, the term of this patent is extended or adjusted under 35 U.S.C. 154(b) by 6 days.

(21) Appl. No.: 15/094,907

(22) Filed: Apr. 8, 2016

(65) Prior Publication Data

US 2017/0294041 A1    Oct. 12, 2017

(51) Int. Cl.
| | |
|---|---|
| *G06T 13/80* | (2011.01) |
| *G06F 3/0484* | (2013.01) |
| *A63B 22/06* | (2006.01) |
| *A63B 21/00* | (2006.01) |
| *G06F 3/0481* | (2013.01) |

(52) U.S. Cl.
CPC .......... *G06T 13/80* (2013.01); *G06F 3/04845* (2013.01); *G06F 3/04847* (2013.01); *A63B 21/00061* (2013.01); *A63B 22/0694* (2013.01); *G06F 3/04815* (2013.01)

(58) Field of Classification Search
CPC ................ G06F 3/011; A63B 22/0012; A63B 21/00061; A63B 22/0694; A63B 22/0605; A63B 21/4047
See application file for complete search history.

(56) References Cited

U.S. PATENT DOCUMENTS

| | | | |
|---|---|---|---|
| 2005/0091019 A1* | 4/2005 | Clavadetscher ... | H04N 13/0275 703/8 |
| 2007/0093360 A1* | 4/2007 | Neff ..................... | A63B 21/008 482/8 |
| 2013/0219344 A1* | 8/2013 | Zyracki .................. | G06T 13/20 715/849 |

(Continued)

OTHER PUBLICATIONS

Barbic,"Interactive Editing of Deformable Simulations", ACM Transactions on Graphics (TOG), 2012, 8 pages.

(Continued)

*Primary Examiner* — Saptarshi Mazumder
(74) *Attorney, Agent, or Firm* — Wolfe-SBMC (57) ABSTRACT

In embodiments of animation using keyframing and projected dynamics simulation, an animation object is displayed with handles associated with object regions for the animation object, each handle being selectable for setting animation constraints on an object region. An animation simulator receives a user input designating a particular handle with an animation constraint, and sets the animation constraint on the particular handle for the associated object region. The animation simulator also receives another user input, designating a timing of the object region associated with the particular handle of the animation object through multiple frames in an animation sequence. The animation simulator projects a simulation of the animation object utilizing a projected dynamics algorithm that applies physics to simulate the set of object regions of the animation object in the animation sequence, the simulation including simulating the object region associated with the particular handle based on the timing and the animation constraint.

20 Claims, 6 Drawing Sheets

(56) References Cited

U.S. PATENT DOCUMENTS

2013/0304587 A1* 11/2013 Ralston .............. G06Q 30/0271
705/14.67

OTHER PUBLICATIONS

Barzel,"A Modeling System Based on Dynamic Constraints", In Computer Graphics (Proceedings of SIGGRAPH 88), ACM SIGGRAPH, Annual Conference Series, Aug. 1988, pp. 179-188.

Barzel,"Plausible Motion Simulation for Computer Graphics Animation", In Computer Animation and Simulation '96, Proceedings of the Eurographics Workshop, 1996, 14 pages.

Bergou,"TRACKS: Toward Directable Thin Shells", ACM Transactions on Graphics 26, 2007, 10 pages.

Bouaziz,"Projective Dynamics: Fusing Constraint Projections for Fast Simulation", ACM Transactions on Graphics (TOG), 2014, 11 pages.

Chenney,"Sampling Plausible Solutions to Multi-body Constraint Problems", In Proceedings of ACM SIGGRAPH 2000, Annual Conference Series, 2000, 11 pages.

Hahn,"Rig-Space Physics", ACM Transactions on Graphics 31, 2012, 8 pages.

Hildebrandt,"Interactive Spacetime Control of Deformable Objects", ACM Transactions on Graphics (TOG), 2012, 8 pages.

Jacobson,"Bounded Biharmonic Weights for Real-Time Deformation", In ACM SIGGRAPH 2011 Papers, SIGGRAPH '11, 2011, 8 pages.

Jacobson,"Fast Automatic Skinning Transformations", ACM Trans. Graph. 31,, 2012, 10 pages.

Jones,"Dynamic Sprites", In Proceedings of Motion on Games, 2013, 8 pages.

Kass,"Animating Oscillatory Motion with Overlap: Wiggly Splines", In ACM Transactions on Graphics (TOG), 2008, 8 pages.

Koyama,"Real-Time Example-Based Elastic Deformation", Eurographics/ ACM SIGGRAPH Symposium on Computer Animation, 2012, 6 pages.

Liu,"Fast Simulation of Mass-Spring Systems", ACM Transactions on Graphics, vol. 32, No. 6, Article 209,, Nov. 2013, 7 pages.

Liu,"Synthesis of Complex Dynamic Character Motion from Simple Animations", Published in ACM Transactions on Graphics (SIGGRAPH 2002), 2002, 9 pages.

Martin,"Example-Based Elastic Materials", ACM Trans. Graph., Mar. 2011, 8 pages.

Muller,"Meshless Deformations Based on Shape Matching", ACM Transactions on Computer Graphics, 24, 3 (2005), 2005, 8 pages.

Muller,"Solid Simulation with Oriented Particles", ACM Trans. Graph. 30, 2011, 9 pages.

Popovic,"Interactive Manipulation of Rigid Body Simulations", In Computer Graphics (Proceedings of SIGGRAPH 2000), ACM SIGGRAPH, Annual Conference Series, 2000, 9 pages.

Rivers,"FastLSM: Fast Lattice Shape Matching for Robust Real-Time Deformation", ACM Trans. Graph. 26, Jul. 2007.

Schumacher,"Efficient Simulation of Example-Based Materials", Eurographics/ ACM SIGGRAPH Symposium on Computer Animation (2012), 2012, 8 pages.

Twigg,"Many-Worlds Browsing for Control of Multibody Dynamics", ACM Transactions on Graphics 26, 2007, 8 pages.

Witkin,"Spacetime Constraints", In Computer Graphics (Proceedings of SIGGRAPH 88), vol. 22, 1988, 11 pages.

* cited by examiner

ANIMATION USING KEYFRAMING AND PROJECTED DYNAMICS SIMULATION

BACKGROUND

Animation artists create graphical object animations, such as cartoons and cartoon-like animations utilizing computing devices with various animation authoring tools and applications. Generally, animations are created as graphical objects that change over time, such as an animated object that appears to move across a display screen of a user device. The changes of a graphical object over time may be viewed as within the physical constraints that one would expect to see for a particular object, or the changes may be physical effects that are not physically realizable, but yet can be animated. For example, a cartoon character may stretch beyond what one would expect a person being physically capable of doing. In other instances, a graphical object may be animated over a time duration to change any number of properties, such as size, shape by morphing into a different shape, color, transparency, position, skew, rotation, and any other various properties of the object.

Physical simulation techniques are a traditional way to introduce natural and secondary effects in animations utilizing a computing device, but are exceedingly challenging to control. Further, creating physical-based simulations become more difficult as animators naturally want to add physical effects to animations that are not physically realizable. Inherently, physical simulation techniques attempt to maintain the animation of a graphical object within a realizable physical realm, while in contrast, an animator may want the graphical object animated beyond physical reality.

Keyframing techniques enables an animator to set all of the character poses of an animation object, and maintain tight control of key events and the animation shapes in select keyframes of an animation sequence. However, a natural, physical-based flow in the animation frames between each of the keyframes is often challenging or impossible to manually develop. Example-based techniques extend the standard physical simulation methods to bias simulated shapes towards artist created poses but cannot control when these poses are reached. Space-time optimization methods seek to find physical conditions that will satisfy the goals of an animator when developing an animation. However, these methods are computationally expensive, and remain challenging for an animator to direct and edit because key events are generally not realizable from optimized models. Constraint-based dynamics extend the physical simulation methods by constraining simulated materials to follow animator inputs, but still cannot produce exaggerations beyond the limits of the physical models.

SUMMARY

This Summary introduces features and concepts of animation using keyframing and projected dynamics simulation, which is further described below in the Detailed Description and/or shown in the Figures. This Summary should not be considered to describe essential features of the claimed subject matter, nor used to determine or limit the scope of the claimed subject matter.

Animation using keyframing and projected dynamics simulation is described. In embodiments, an animation object can be displayed with handles associated with object regions for the animation object, and each handle is selectable to set one or more animation constraints on an object region associated with one or more of the handles. A computing device can execute an animation simulator as a computer application that receives first user input designating a particular handle or handles with one or more of the animation constraints, where the first user input is received in a keyframe of an animation sequence that includes multiple frames of the animation object. The animation simulator sets the animation constraints on the particular handle or handles for the object regions associated with the particular handle or handles based on the user input. The first user input designating the particular handle or handles may be a partial keyframing input in the keyframe of the animation sequence, and the animation simulator sets the animation constraints for the respective object regions of the animation object. The animation simulator can also receive a second user input for the particular handle or handles in the keyframe, designating a timing of the object regions associated with particular handle or handles of the animation object through the multiple frames in the animation sequence. The animation simulator is implemented to then project a simulation of the animation object utilizing a projected dynamics algorithm that applies physics to simulate the set of object regions of the animation object in the animation sequence. The simulation includes simulating the object region or regions associated with the respective particular handle or handles of the animation object based on the timing and the animation constraint. The projected simulation of the animation object includes the projected dynamics algorithm applying the animation constraint to the object region associated with the particular handle or handles as a physics force on the animation object over time.

In other aspects of animation using keyframing and projected dynamics simulation, the handles of the animation object are associated with the object regions of the animation object, and each of the object regions is modeled as a portion of a mesh that defines the animation object in a two-dimensional space. In the projected simulation of the animation object utilizing the projected dynamics algorithm, the animation simulator projects an update for each of the handles, and moves the portion of the mesh that corresponds to the object region in the set of object regions based on the projected update for each of the handles. The handles of the animation object each includes parameters that define a handle rotation and a handle translation in two-dimensional space. The first user input designating the particular handle or handles can be received, and the animation simulator sets the animation constraint on the particular handle or handles for the object region or regions by configuring the handle rotation and the handle translation of the particular handle or handles. Further, based on the first user input designating the particular handle or handles, the animation simulator can animate a feature of the animation object by extending the feature beyond physical limitations, while the handles of the animation object that are not subject to an animation constraint designated by the user are simulated utilizing the projected dynamics algorithm within physical limitations to generate the animation sequence of the animation object.

BRIEF DESCRIPTION OF THE DRAWINGS

Embodiments of animation using keyframing and projected dynamics simulation are described with reference to the following Figures. The same numbers may be used throughout to reference like features and components that are shown in the Figures.

DETAILED DESCRIPTION

Artist-directed dynamics are implemented to provide animators the benefits of simulation for animation, without the constraints that are typically associated with physical-based animation techniques. Embodiments of animation using keyframing and projected dynamics simulation are described as a unified technique that combines simulation with keyframing. The combination of these approaches improves both of the animation extremes, in that simulation becomes more customizable and keyframing becomes more automatic. The technique enables an animator direct and intuitive control of physical effects when authoring animations. An animator can use projected dynamics for physical simulation to create natural and secondary effects for an animation object, yet the animator still maintains control of the animation object with keyframing, such as to exaggerate and change the animation results. The physical simulation can be used to automatically displace and deform objects in a life-like way. For example, an animation object that represents a rigid object will move according to its mass, velocity, and imposed forces, whereas an animation object that represents an elastic object will further deform according to internal energy.

Generally, animation is the art of controlling an animation object with timing and spacing. An animator sets the timing to control the beat, rhythm, and tempo of motion. For example, a large, heavy ball will fall with a thud, and its timing between each bounce decreases rapidly, whereas a small, light ball will appear to spring across the display screen, with its timing almost constant in comparison. Given the timing of key events and extremes of an animation object, the spacing determines the movement and deformation in frames between the keyframes. For example, a ball at the top of its arc will slow down, and the spacing in nearby frames reduces (or overlaps) until the ball falls down again, gaining speed and traversing more space over every frame. Both of the timing and spacing elements have profound effect on the final appearance of an animation object. For example, a slower timing transforms a nervous finger tap into a sluggish, pensive motion. Different spacing can remake a simple up-down elevator motion into either a bouncing ball that slows down (easing in motion) at the top of its arc, or into a yo-yo that slows down at both the top and the bottom of its motion.

Animation timing is a global property while animation spacing is a local feature, and this dichotomy complicates all systems that look to control the interaction of both. Two classical workflows of hand-drawn animation are straight-ahead animation and pose-to-pose animation. For the straight-ahead animation approach, an animator proceeds locally from one frame to another, setting all of the features for an animation object. For the pose-to-pose animation approach, an animator maps out the most important key poses of the animation object first, before breaking them down into extremes and then passing positions. Each animation approach has advantages and disadvantages. The straight-ahead animation approach induces creativity with fluid and natural animation actions of the animation object, but the timing can begin to drift and wander. The pose-to-pose animation approach crystallizes the timing, but the action of the animation object can become choppy and unnatural.

This same tension reappears in modern animation workflows of simulation and keyframing. Simulation, like the straight-ahead animation approach, sequentially propagates initial values set for the animation object to subsequent frames of an animation. Keyframing, like the pose-to-pose animation approach, breaks down the animation extremes into corresponding in-between frames. The simulation approach provides that an animator can generate frame-to-frame realism of the animation object, but the end result may not be at the right place at the right time (e.g., from a timing perspective). The keyframing approach allows the animator to keep key events and extremes of the animation object at the right place and time, but the in-between frames may not flow together well (e.g., from a spacing perspective).

For hand-drawn animations, a hybrid workflow begins with the pose-to-pose planning, and then uses the straight-ahead animation technique to fill in and improvise between global, pose-to-pose placeholders. After one pass, the animation process repeats with each refinement adding more detail to the previous structure. In modern animation systems, like the pose-to-pose workflow, focus is on timing by seeking simulations that place objects with the right timing. Others, like straight-ahead workflows, focus on spacing by driving simulations towards planned keyframes and poses.

In embodiments of animation using keyframing and projected dynamics simulation, the combination of simulation with keyframing provides an animation system in which an animator can formulate a fluid animation workflow from both a timing and spacing perspective. When the simulation aspect of an animation needs input, the animator can add keyframes to direct the animation object to the desired path. Similarly, when the keyframes of the animation have the effect to stifle action of the animation object, the animator can allow for more simulation by relaxing the animation constraints instead. In implementations, each frame of an animation can be simulated, but each simulation step incorporates the input of the animator's examples and trajectories on the animation object in the keyframes. The input examples to the animation object guide the spacing by exaggerating or suppressing deformation, or both, on different parts of the object. The input trajectories command the timing of the animation object, such as for the entire object, some of the object parts, or none at all. The simulation aspect of the animation using projected dynamics simulation fills in each unspecified part of the animation object with naturalistic animation.

While features and concepts of animation using keyframing and projected dynamics simulation can be implemented in any number of different devices, systems, networks, environments, and/or configurations, embodiments of animation using keyframing and projected dynamics simulation are described in the context of the following example devices, systems, and methods.

Figure 1:
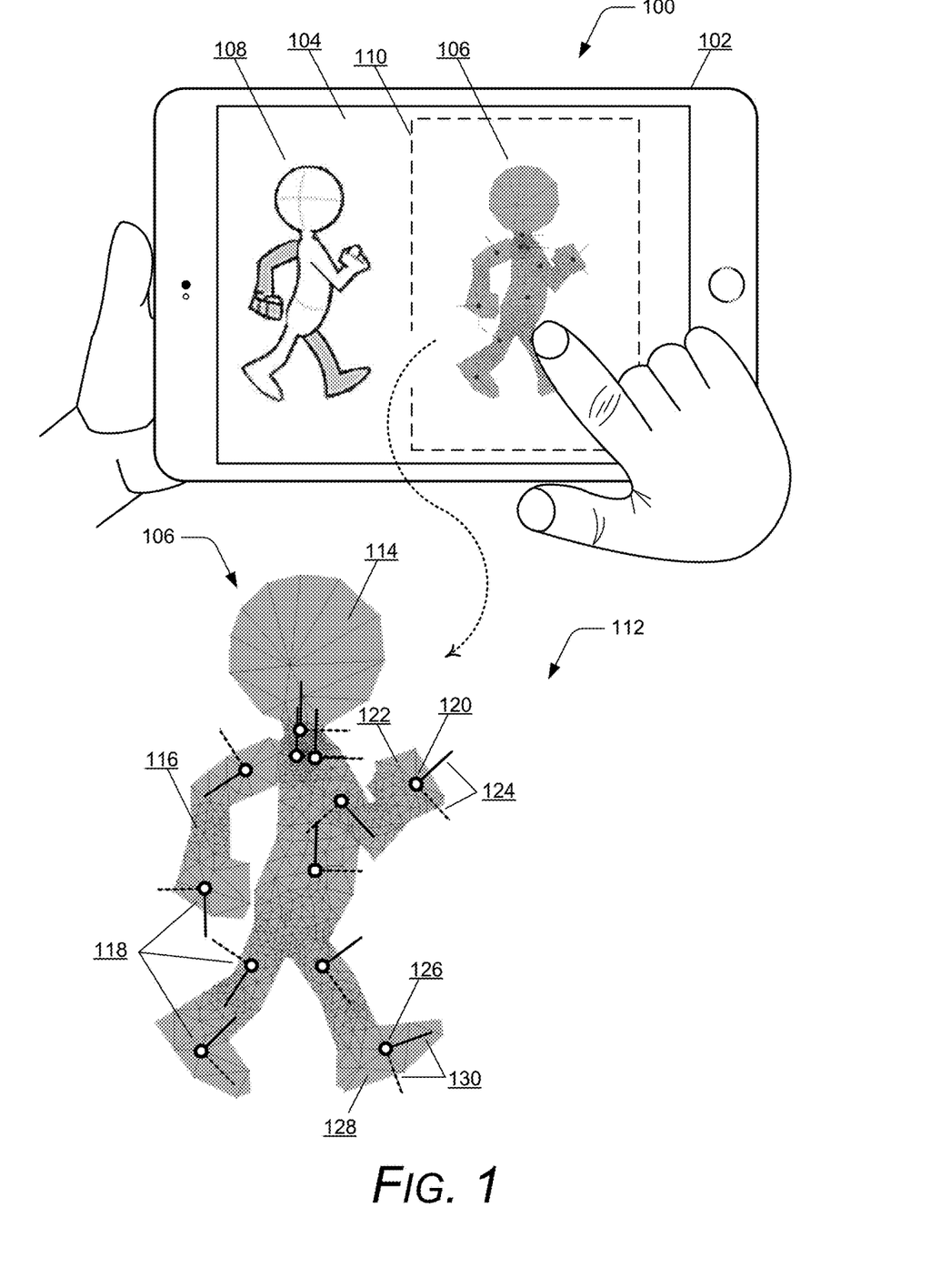
FIGS. 1-4 illustrate examples of animation using keyframing and projected dynamics simulation implemented with a mobile computing device in accordance with one or more embodiments as described herein.

FIG. 1 illustrates an example 100 of animation using keyframing and projected dynamics simulation, implemented with a mobile device, such as a tablet device 102 shown in this example. As detailed in the system description shown in FIG. 5, the tablet device 102 includes a display 104 on which an animation object 106 can be displayed. The animation object 106, also shown as a representation of an articulated character 108 in this example, may be generated for display by many different types of animation-based computer applications implemented by a computing device, such as the tablet device 102. In a keyframe 110 of an animation sequence for the animation object 106, a user (also referred to as an animator or an artist) of the device can manipulate the animation object to selectively set animation constraints on regions of the animation object, which are then used to animate the articulated character 108.

As further shown at 112, the animation object 106 includes multiple object regions (e.g., a head region 114, an arm region 116, and other regions) each modeled as a portion of a mesh that defines the animation object in a two-dimensional space. The animation object 106 also includes multiple handles 118 that are associated with the object regions, each handle being selectable for setting one or more animation constraints on an associated object region of the animation object. For example, a handle 120 is associated with a hand region 122 of the animation object 106, and the animation constraints of the hand region 122 can be set by an animator as handle rotation and/or handle translation with handle controls 124 of the handle 120. Another example is handle 126 associated with a foot region 128 of the animation object 106, and the animation constraints of the foot region 128 can be set by the animator as handle rotation and/or handle translation with handle controls 130 of the handle 126.

The handles 118 (to include the example handles 120, 126) provide an animator handle-space control as the primary user interface for timing, spacing, and retargeting the animation object 106 from which an animation simulation is generated. Conventionally, an animation object can be represented by a triangular mesh that has many vertices, and an animator has to manually manipulate each one of the mesh vertices to move parts of the object shape. However, in embodiments of animation using keyframing and projected dynamics simulation, the multiple handles 118 can each be user created and placed to control an entire region of the mesh and the associated mesh vertices. The animator can place a handle 118 and associate it with a region of the mesh that encompasses multiple vertices of the mesh.

The animator can then manipulate one or more of the handles to set the animation constraints on the animation object 106, and the handles are then simulated (also referred to herein as forward-simulated) as physical elements in handle space utilizing the projected dynamics simulation, in which a projected dynamics algorithm applies physics to simulate the object regions of the animation object in an animation sequence. As noted above, an object region of the animation object 106 may be controlled or manipulated by one or more of the handles 118, and each of the handles are selectable for setting one or more animation constraints that are then applied to the associated object regions that correspond to the one or more handles. Accordingly, this may be a one-to-one relationship between an animation constraint and an associated object region, may be a many-to-one relationship of multiple animation constraints on one object region, or may be one animation constraint for multiple object regions of the animation object.

The handles 118 of the animation object 106 are selectable for an animator to interface with the animation object 106 in keyframes of an animation sequence, and are designed to represent how the animator would want to utilize physics (e.g., the projected dynamics simulation) in a way that is perceived as having an expected, normal result based on an intuitive sense of animation control. Further, the animator can opt to set the animation constraints for only a subset of the handles (e.g., as few as only one handle, a couple of the handles, or more of them) to control as much or as little of the animation as desired. This is referred to as partial keyframing input to set one or more of the animation constraints on a handle or handles 118 for the respective associated object regions of the animation object 106 in the keyframe 110. For example, the animator may only want to set the animation constraints relative to the handle 120 associated with the hand region 122 of the animation object 106, and set the animation constraints relative to the handle 126 associated with the foot region 128 of the animation object. These handles are referred to herein as selected handles (e.g., selected by a user) or as the constrained, designated, or particular handles that are set with one or more of the animation constraints.

An animator can designate a particular handle or handles with one or more of the animation constraints, and based on the animator input, the animation system sets the animation constraints on the particular handle or handles for the object region or regions of the animation object that are associated with the particular handle or handles. The rest of the animation object handles are not set with animation constraints (e.g., handles not having animation constraints set by the animator) and may also be referred to herein as the non-constrained or non-designated handles. The animator can utilize the handles 118 to set critical features (e.g., as deemed by the animator) of the animation object 106 in a keyframe or keyframes of the animation sequence, and then initiate the simulation (e.g., forward-simulation) with the projected dynamics simulation on all of the other features of the animation object to generate the animation sequence of the simulation.

In implementations, a handle 118 of the animation object 106 defines degrees of freedom for the object regions of the object, and the animator can translate, rotate, and/or scale any one or more of the handles 118 to set the animation constraints that are then applied by the projected dynamics simulation, which is applied in handle space (e.g., the physics simulation is applied at the handle level, rather than at the mesh level). The animation constraints can be set to constrain the motion of a handle 118 by providing a trajectory for all or some subset of its degrees of freedom. For example, the animator can select a handle by touch-select or with a pointing device, and move the handle to alter or deform the associated object mesh region in a translation motion. Alternatively or in addition, the animator can select the handle controls to rotate the handle and alter or deform the associated mesh region in a rotation motion. Thus, translating or rotating a handle 118 moves and/or rotates the corresponding portion of the mesh in an associated object region of the animation object 106, rather than just moving the handle itself "over" the mesh.

As noted above, each handle is associated with an object region of the animation object 106, and the handles may be related by elastic deformation, or if not, the animator can indicate their semantic similarity by marking handles in correspondence. Together, the fluid workflow and the handles as an interface on the animation object 106 provide interaction functionality. Additionally, animations of the animation system can be nested and composed by using any one of the handles 118 to key the motion of another handle. Overlapping actions and colliding interactions can be modeled, as well as simulation retargeting operations on the animations. With these features, an animator has both the ability to customize any animation, and then also compose and reuse the best of the animations by reapplying them onto other animated objects.

Figure 2:
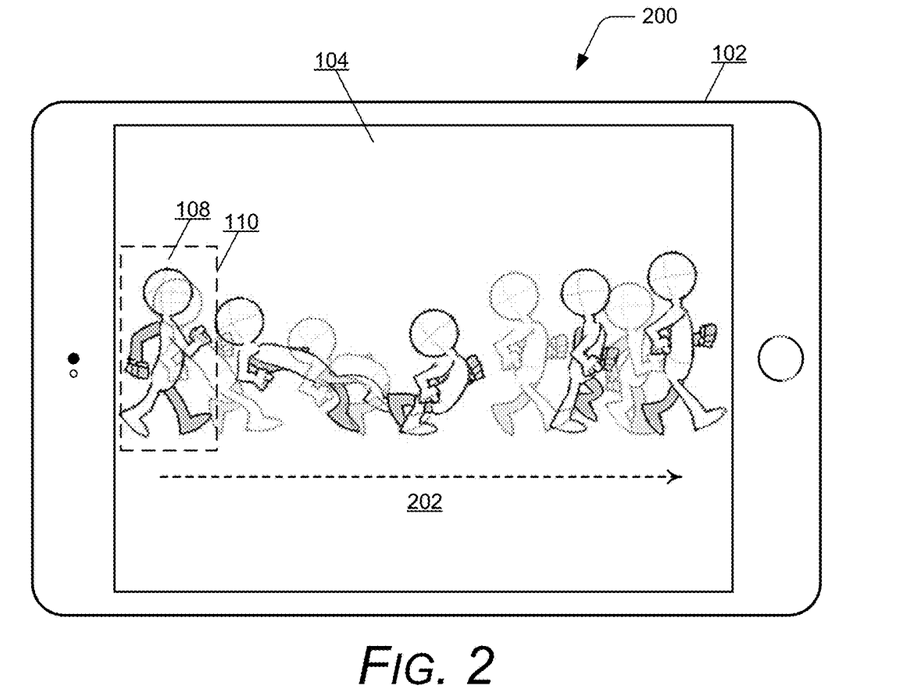

FIG. 2 illustrates an example 200 of an animation simulation 202 of the articulated character 108 in a walking cycle with an exaggerated heavy bodyweight. The animation simulation 202 results from the animation constraints set on the animation object 106 by the animator with partial keyframing and then forward-simulation applied utilizing the projected dynamics simulation, as shown and described with reference to FIG. 1. In addition to the keyframe 110 in which the animator selectively sets the animation constraints on the handles 118 for the associated object regions of the animation object of the articulated character 108, the animation simulation 202 includes multiple other image frames (not shown), for each instance of the articulated character throughout the animation sequence of the simulation. In this example, the articulated character appears to walk across the display 104 of the tablet device 102 with a cartoonish, non-physical effect (e.g., the exaggerated heavy bodyweight) based on the animation constraints set by the animator and then simulated using the projected dynamics simulation.

Figure 3:
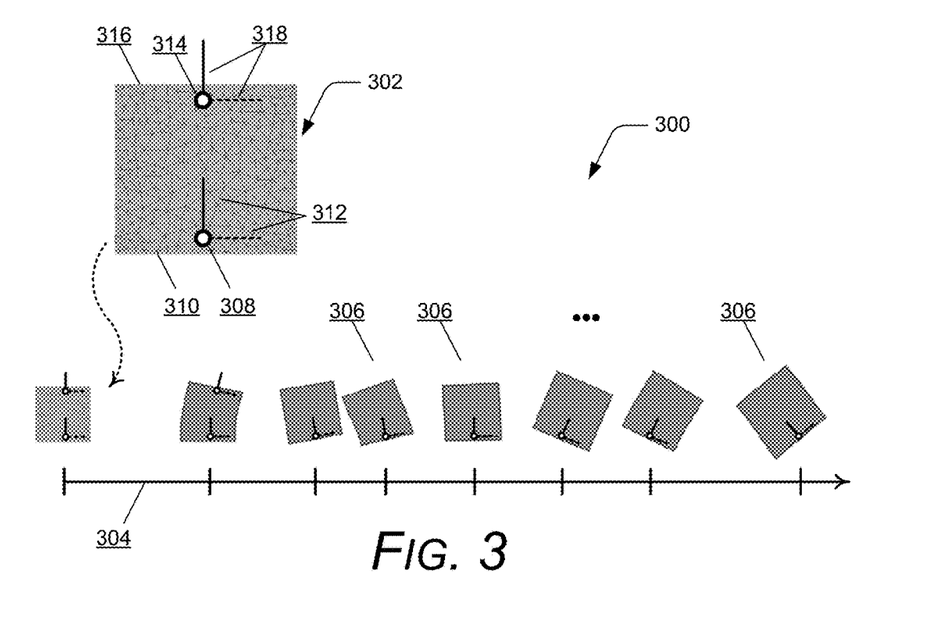

FIG. 3 illustrates another example 300 of animation using keyframing and projected dynamics simulation. In this example, a simple animation object 302 (e.g., a square or a box) is shown along a timeline of an animation sequence 304 in eight separate keyframes 306. The animation object 302 includes two handles, each one being selectable to set one or more animation constraints on an associated region of the animation object. For example, a handle 308 is associated with a lower region 310 of the animation object 302, and the animation constraints of the lower region 310 can be set by an animator as handle rotation and/or handle translation with handle controls 312 of the handle 308. Another handle 314 is associated with an upper region 316 of the animation object 302, and the animation constraints of the upper region 316 can be set by the animator as handle rotation and/or handle translation with handle controls 318 of the handle 314.

In each keyframe 306 of the animation sequence 304, an animator can set the animation constraints on the handles for the respective associated regions of the animation object 302 in each of the keyframes 306. In this example, the animator sets the handle rotation constraints for both of the handles 308, 314 in the first two keyframes to position the timing and shape of the animation object 302, and then sets just the handle rotation constraint for the handle 308 associated with the lower region 310 in the remaining keyframes. The handle rotation constraint is set on the bottom handle 308 in each of the keyframes 306 to turn the square animation object 302 back and forth in preparation for an animation simulation of the object tumbling. The upper handle 314 is a non-constrained handle for simulation utilizing the projected dynamics without animation constraints, which generates the tumbling animation simulation of the animation object, filling in all of the other animation frames that depict the animation of the object between the keyframes. This example illustrates the aspect of partial keyframing, in that the animator only had to input the animation constraints for one of the object handles (e.g., handle 308 as a constrained handle), and the projected dynamics simulation accounts for any other object handles (e.g., handle 314 as a non-constrained handle) that has not had animation constraints set by the animator.

Figure 4:
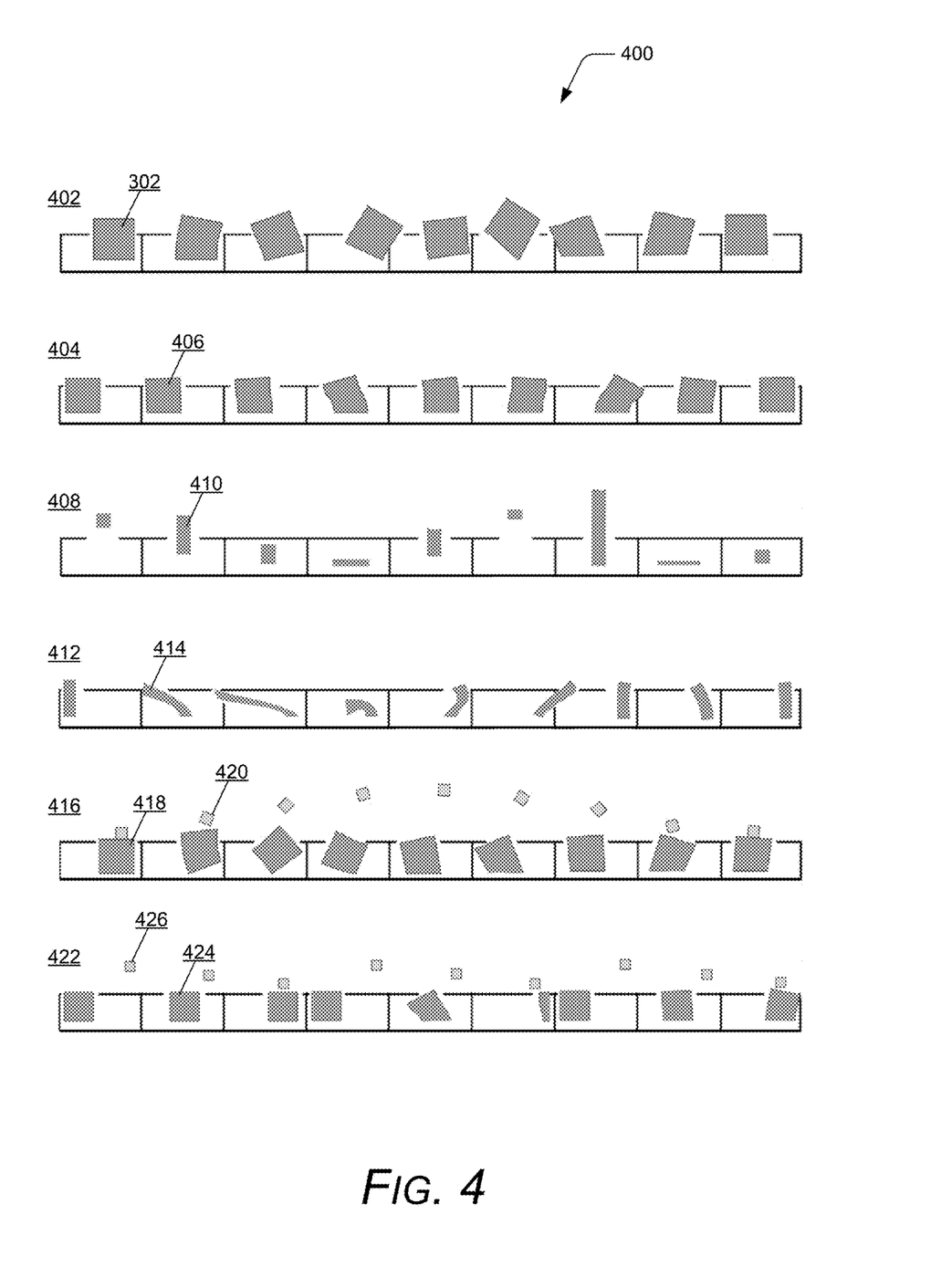

FIG. 4 illustrates additional examples 400 of animation principles using keyframing and projected dynamics simulation. An animation example 402 further illustrates the animation object 302 as shown and described with reference to FIG. 3, in the context of an animation principle, anticipation. Anticipation planning occurs when simulation is paired with control or corresponding constraints, such as space-time or dynamic constraints. The animation techniques using keyframing and projected dynamics simulation described herein adapts dynamic constraints, allowing the simulation to track trajectories that induce desired anticipation. The anticipation principle is illustrated using the square animation object 302 rotating about one corner. As described with reference to FIG. 3, the orientation constraints are set in the keyframes on the lower region handle 308 to turn the square back and forth at the beginning in preparation for the tumbling animation simulation generated utilizing the projected dynamics simulation.

An animation example 404 illustrates an animation object 406 in the context of another animation principle, slow-in and slow-out. This is a physical-based principle that emerges automatically as simulated objects move in response to external forces and collisions. The slow-in and slow-out spacing on one of the animation objects (e.g., the boxes) creates the illusion of a faster arrival in addition to making that box appear heavier. When the movement needs to be refined precisely, the animation techniques using keyframing and projected dynamics simulation described herein allows an animator to control speed with keyframes, or when more convenient, by adjusting the mass, coefficients of friction, and other simulation parameters.

An animation example 408 illustrates an animation object 410 in the context of another animation principle, squash and stretch. Elastic simulation produces squash and stretch automatically. An animator can modify the simulation properties to adjust these deformations, but it should be noted that this indirect approach may not provide the desired customization. Furthermore, as seen in animated cartoons, even the elastic model may not be appropriate for some squash-and-stretch animation. This can be seen in the squash-and-stretch animation, where the amount of deformation necessitates plastic instead of elastic deformation. In this example, the extreme squash and stretch effect is recreated by repeatedly expanding and compressing animation object handles at the top and bottom of the object utilizing the keyframing and projected dynamics simulation animation techniques described herein.

An animation example 412 illustrates an animation object 414 in the context of another animation principle, follow through and overlapping action. Analogous to the squash-and-stretch animation example 408, simulation yields movement with realistic follow through but without the control needed for further customization and exaggeration. Overlapping action then synchronizes deliberate and often keyframed actions, which initiate the movement, with the follow-through and other reactions that appear in response. The animation techniques using keyframing and projected dynamics simulation described herein support this synergy by emulating sample animation for the corresponding principle. First, the drag can be exaggerated with a pin constraint, delaying the action at the top of the rectangle. As the animation progresses, the constraint is released allowing the elastic simulation to take over and recreate corresponding follow through. The initial movement, drag, and follow through can all be further customized either with existing or new animation constraints.

An animation example 416 illustrates an animation object 418 (e.g., the larger box) and an animation object 420 (e.g., the smaller box) in the context of the animation principle, secondary action. Simulation can be used to add secondary animation automatically. The animation techniques using keyframing and projected dynamics simulation described herein improves on this process with simpler synchronization of primary and secondary actions. In this example, the larger box follows the motion similar to the anticipation example, and a secondary action of the smaller box bounces on top of the larger box. The contact force between the larger and smaller boxes is scripted. After the smaller box bounces twice, the two bottom corners of the smaller box are constrained so that it stays on the larger box. The animation of each box can be further refined and adjusted, using the animation constraints to maintain proper synchronization between the boxes.

An animation example 422 illustrates an animation object 424 (e.g., the larger box) and an animation object 426 (e.g., the smaller box) in the context of the animation principles, straight-ahead and pose-to-pose. The left three frames 428 represent the animation principle of pose-to-pose only; the middle three frames 430 represent the animation principle of straight-ahead only; and the right three frames 432 represent the combined workflows of straight-ahead and pose-to-pose. As described above, the two animation principles are classical animation workflows with complementary benefits and drawbacks. The technique of a pose-to-pose workflow makes it easier for an animator to plan out timing of the animation objects, but the end result may be a choppy animation simulation. The technique of a straight-ahead workflow leads to fluid animation, but the timing of the animation simulation can wander and drift. Implementation of the techniques described herein for animation using keyframing and projected dynamics simulation provides an animation solution, beginning with keyframed trajectories having a desired timing, and then refining the animation either by removing the trajectories so that the projected dynamics simulation fills-in fluid motion, or by adding trajectories to constrain the projected dynamics simulation as needed.

Figure 5:
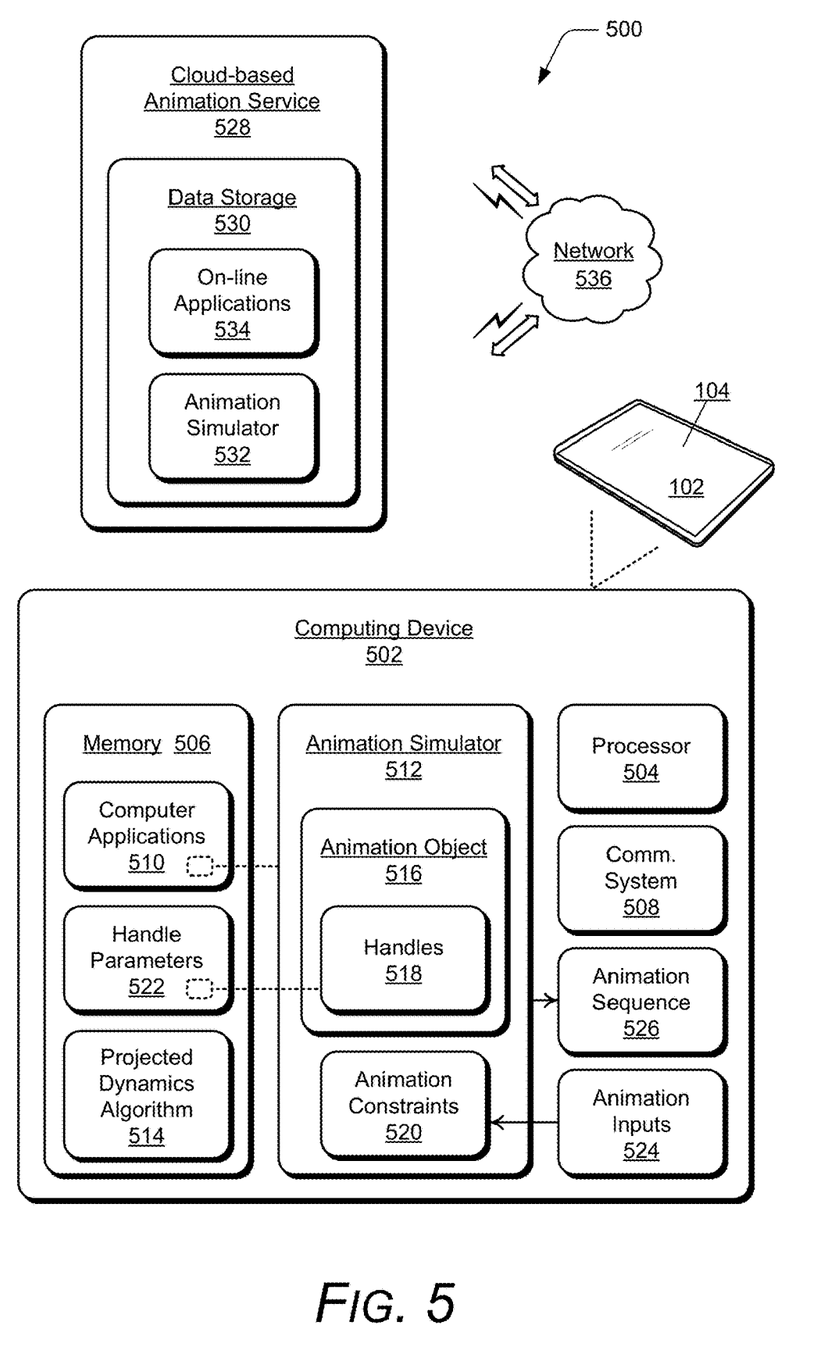
FIG. 5 illustrates an example system in which embodiments of animation using keyframing and projected dynamics simulation can be implemented.

FIG. 5 illustrates an example system 500 in which embodiments of animation using keyframing and projected dynamics simulation can be implemented. The example system 500 includes a computing device 502, such as the tablet device 102 shown in FIGS. 1 and 2, or any other type of a mobile phone, media playback, computing, communication, gaming, entertainment, portable electronic media device, or computer device. The computing device 502 can be implemented with various components, such as a processor 504 (or processing system) and memory 506, and with any number and combination of differing components as further described with reference to the example device shown in FIG. 6. Although not shown, the computing device 502 can include a power source, such as a battery, to power the various device components. Further, the computing device 502 can include different wireless radio systems, such as for Wi-Fi, Bluetooth™, Mobile Broadband, LTE, or any other wireless communication system or format. Generally, the computing device 502 implements a communication system 508 that includes a radio device, antenna, and chipset that is implemented for wireless communication with other devices, networks, and services.

The computing device 502 includes one or more computer applications 510 that implement animation techniques and generate animations as described herein, such as to implement the techniques for animation using keyframing and projected dynamics simulation. In this example, the computer applications 510 include an animation simulator 512 that implements the animation techniques described herein utilizing a projected dynamics algorithm 514. The animation simulator 512 and the projected dynamics algorithm 514 can each be implemented as software applications or modules, such as computer-executable software instructions that are executable with the processor 504 (or with a processing system) to implement embodiments of the animation techniques described herein. The animation simulator 512 and the projected dynamics algorithm 514 can be stored on computer-readable storage memory (e.g., the device memory 506), such as any suitable memory device or electronic data storage implemented in the computing device. Although shown as a separate module or component in memory 506, the projected dynamics algorithm 514 may be integrated as a module or component with any of the computer applications 510, such as the animation simulator 512.

In embodiments, the animation techniques described herein combine keyframing and simulation utilizing projected dynamics. An animation object 516 can be displayed on a display of the computing device 502, such as the animation object 106 shown displayed on the display 104 of the tablet device 102 shown in FIG. 1. The animation object 516 includes handles 518 associated with the object regions for the animation object, and each handle is selectable for setting one or more animation constraints 520 on an object region (of the animation object) associated with a particular handle or handles. The handles 518 of the animation object 516 each correspond to an object region of the animation object, and each of the corresponding object regions is modeled as a portion of the mesh that defines the animation object in two-dimensional space. Handle parameters 522 that define the handles 518 of the animation object 516 define a handle rotation and a handle translation in the two-dimensional space for each of the handles.

For example, the animation object 106 that is shown and described with reference to FIG. 1 includes the multiple object regions that are each modeled as a portion of the mesh that defines the animation object in two-dimensional space. The animation object 106 includes the multiple handles 118 that are each selectable for setting one or more animation constraints on corresponding object regions of the animation object. The animation constraints of an object region can be received as animation inputs from an animator who designates a handle rotation and/or a handle translation with the handle controls of a handle. Accordingly, the handles 518 include constrained or designated handles that are set with one or more of the animation constraints 520. An animator can designate a particular handle or handles with the animation constraints, and the animation simulator 512 sets the animation constraints for the corresponding object region or regions of the animation object 516 based on the animator input. The rest of the animation object handles are not set with animation constraints and are referred to herein as the non-constrained or non-designated handles (e.g., the handles that have not been designated with animation constraints by the animator).

The animation simulator 512 is implemented to receive animation inputs 524 (e.g., user inputs) on handle controls of one or more selected handles 518 for designating a particular handle or handles with the animation constraints 520 for the object region or regions of the animation object 516 that correspond with the particular handle or handles. The animation inputs 524 are received in keyframes of an animation sequence that includes multiple frames of the animation object. An animation input 524 designating a particular handle 518 with an animation constraint can be received by the animation simulator 512 to animate a feature of the animation object 516 by extending the feature beyond physical limitations (e.g., for a cartoonish-like animation). The animation simulator 532 can then simulate (e.g., forward-simulate over time) the particular handle or handles to extend the feature of the animation object beyond the physical limitations, while the handles of the animation object that are not subject to an animation constraint designated by the user are simulated utilizing the projected dynamics algorithm within physical limitations to generate an animation sequence 526 of the simulation of the animation object.

An animator can initiate the animation inputs 524 as partial keyframing inputs to set one or more of the animation constraints 520 as a handle rotation and/or handle translation on a handle 518 of an object region of the animation object 516 that is associated with a particular handle designated with an animation constraint by the animator. The animation simulator 512 can also receive the animation inputs 524 (e.g., user inputs) for the animation object 516 to designate a timing of the animation object through the multiple frames in an animation sequence. The non-designated or non-constrained handles (e.g., the handles not having animation constraints set by the animator) of the animation object 516 can be simulated utilizing the projected dynamics algorithm 514, which applies physics and projects the simulation of the animation object.

The animation simulator 512 utilizes the projected dynamics algorithm 514 to apply physics to the handles 518 of the animation object 516 to generate the animation sequence 526 of the simulation of the animation object based on the designated timing and based on the one or more animation constraints 520 set for the particular designated handle or handles of the animation object. In implementations, the simulation of the animation object 516 projects an update for each of the handles 518, and the animation simulator 512 moves the portion of the mesh that corresponds to the object region or regions for the animation object based on the projected update for each of the handles. The projected dynamics algorithm 514 is applied in handle space on the animation object 516 to generate a projected dynamics simulation.

In embodiments of animation using keyframing and projected dynamics simulation, an animator can control the timing of any region of an animation object, with an arbitrary trajectory, while the simulation responds promptly to any input with feedback of a real-time simulation. In implementations, the projected dynamics algorithm 514 provides the speed, stiffness control, and variational time-stepping for user control of the physical simulation. As described above, the handle-space control uses a small number of handles constructed by the animator to deform an animation object, such as the articulated character 108 shown in FIGS. 1 and 2. In a formulation of the projected dynamics simulation 514, a handle $h_j$ is defined as a single point $p_j$ in a rest shape of the character (e.g., the animation object). The handle parameters include a translation vector $t_j$ and a linear transformation matrix $R_j$. Each vertex $x_i$ on the character is transformed by a linear combination of affine transformations determined by the handles in Equation(1):

$$x_i = \sum_{j=1}^{n} w_{ji}(R_j(x_i^0 - p_j) + t_j)$$

where $w_{ji}$ indicates the influence of handle j on the vertex i, and is computed based on bounded biharmonic weights. The coordinates $x_i^0$ denote the rest position of $x_i$. The relation between vertex positions x and handle parameters h can be expressed by a linear mapping in the matrix-vector form of Equation(2): x=Gh.

The projected dynamics algorithm 514 incorporates physics simulation by representing the character (e.g., an animation object) as a mass-spring system with each vertex on the mesh corresponding to a particle. The motion of a particle can be described by the implicit Euler dynamic equations, as in Equation(3):

$$x^n - 2x^{n-1} + x^{n-2} = h^2 M^{-1} \sum_k f_k(x^n)$$

where $x^n$ is the vector of particle positions to be computed, $x^{n-1}$ and $x^{n-2}$ are the positions from the two previous time steps, M is the mass matrix, h is the time step, and $f_k$ is a force in the dynamic system evaluated at the unknown state.

Variational implicit Euler casts the implicit forward simulation into an optimization problem such that the minimizer of the optimization corresponds to the solution to the dynamic equations (e.g., Equation(3) above). At each time step, the unknown state $x^n$ is solved with the Equation(4):

$$\min_{x^n} \frac{1}{2h^2}(x^n - 2x^{n-1} + x^{n-2})^T M(x^n - 2x^{n-1} + x^{n-2}) + \sum_k E_k(x^n)$$

where $E_k$ indicates a potential energy function whose negative gradient corresponds to force $f_k$ in the Equation(3) above. An advantage of this energy formulation is that the desired behaviors of the character can be intuitively formulated as potential and/or constraint functions. For example, an elastic behavior can be represented by the following constraint function as Equation(5):

$$E(x) = \frac{1}{2}\sum_{(i,j)\in\varepsilon} k_{ij}\|x_i - x_j - d_{ij}\|^2$$

where $\varepsilon$ is a set of edges connecting particles in the mesh, $d_{ij}$ is the rest length of the edge, and $k_{ij}$ is the stiffness. The objective function is projected in its variational implicit Euler form to the handle space in the following projection of Equation(6) using the linear relation in Equation(2) from above. The handles are used as the simulated degrees of freedom in solving the physical simulation, which is referred to as reduction as detailed in Equation(6):

$$\min_h \frac{1}{2h^2} y^T M y + \sum_k E_k(h)$$
$$y = G(h^n - 2h^{n-1} + h^{n-2})$$

where $h^{n-1}$ and $h^{n-2}$ are the handle parameters for the previous two time steps. The keyframe constrained handles are then used as soft constraint forces in the time integrator, as detached in the following Equation(7). In addition to the standard pin constraints and spring constraints on the particles, constraints on the handles can be directly enforced to enable precise control of timing with Equation(7):

$$E(h) = \frac{1}{2}\sum_{i=1} k_i \|h_i - r_i\|^2$$

where $r_i$ is the desired handle value specified by the animator. To solve the optimization in Equation(6) efficiently, local and global steps can be used, as in projective dynamics.

The example system 500 can also include a cloud-based animation service 528, such as Adobe Creative Cloud™ that is accessible by client devices, to include the computing device 502 and the tablet device 102. The animation service 528 includes data storage 530 that may be implemented as any suitable memory, memory device, or electronic data storage for network-based data storage. The data storage 530 can maintain an instance of the animation simulator 532, to include the projected dynamics algorithm, as well as on-line applications 534 (e.g., as network-based applications), that are accessible by a computer application 510 from the computing device 502. In embodiments, aspects of animation using keyframing and projected dynamics simulation as described herein can be implemented by the animation simulator 532 at the cloud-based animation service 528 and/or may be implemented in conjunction with the animation simulator 512 that is implemented by the computing device 502.

The cloud-based animation service 528 can also be implemented with server devices that are representative of one or multiple hardware server devices of the animation service. Further, the cloud-based animation service 528 can be implemented with various components, such as a processing system and memory, as well as with any number and combination of differing components as further described with reference to the example device shown in FIG. 7 to implement the services, applications, servers, and other features of animation using keyframing and projected dynamics simulation.

The example system 500 also includes a network 536, and any of the devices, servers, and/or services described herein can communicate via the network, such as for data communication between the computing device 502 and the cloud-based animation service 528. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example method 600 is described with reference to FIG. 6 in accordance with one or more embodiments of animation using keyframing and projected dynamics simulation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like.

Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
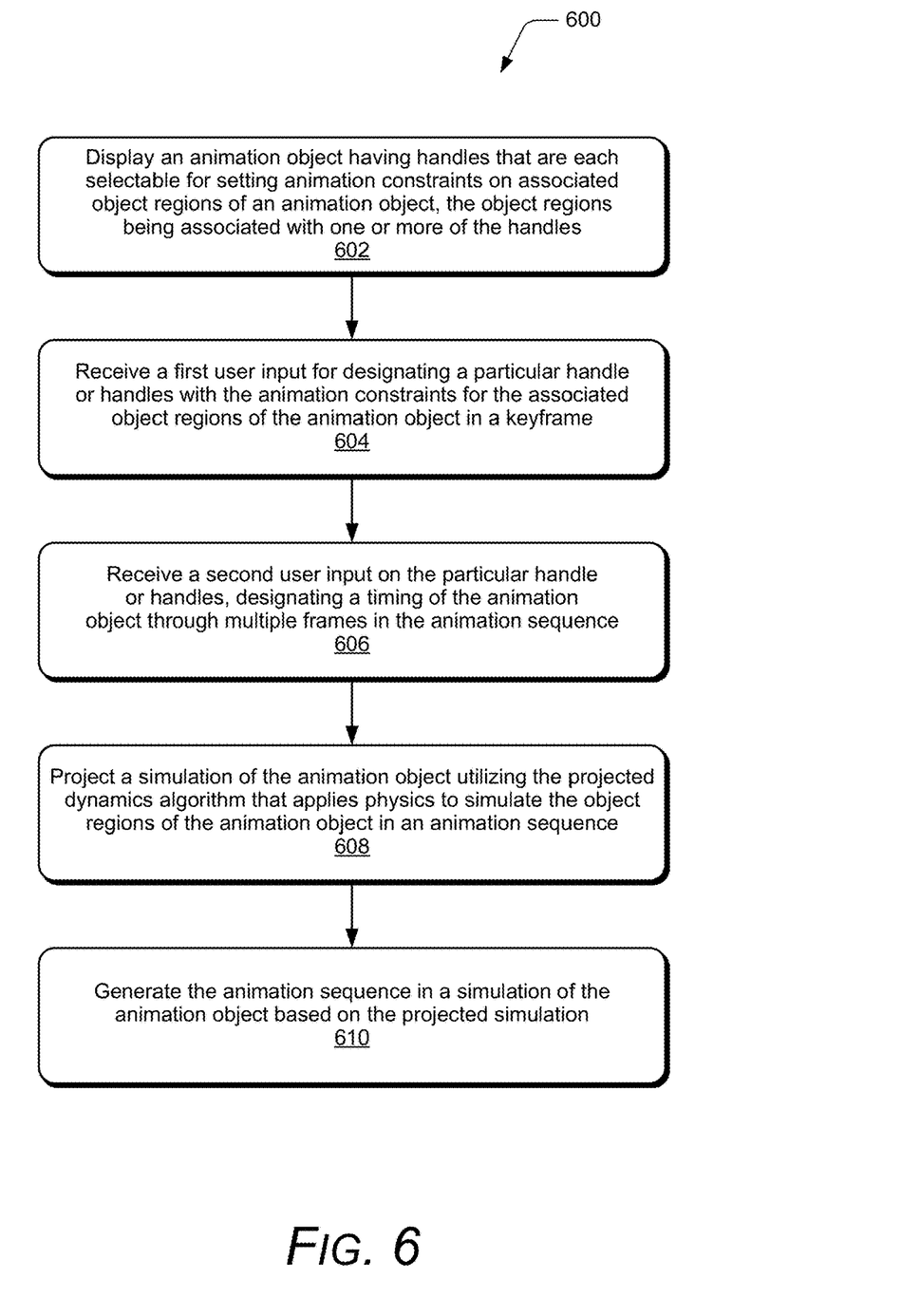
FIG. 6 illustrates example methods of animation using keyframing and projected dynamics simulation in accordance with one or more embodiments of the techniques described herein.

FIG. 6 illustrates example method(s) 600 of animation using keyframing and projected dynamics simulation, and is generally described with reference to the animation simulator implemented by the computing device as shown in the example system of FIG. 5. The order in which the method is described is not intended to be construed as a limitation, and any number or combination of the method operations can be combined in any order to implement a method, or an alternate method.

At 602, an animation object is displayed having handles that are each selectable for setting animation constraints on object regions of an animation object, the object regions being associated with one or more of the handles. For example, the animation object 106 is displayed on the display 104 of the tablet device 102, as shown and described with reference to FIG. 1, and the animation object 106 includes the multiple handles 118 that are each selectable for setting one or more animation constraints on an object region associated with one or more of the handles of the animation object. The handles 118 of the animation object 106 each correspond to an object region of the animation object, and each of the object regions is modeled as a portion of a mesh that defines the animation object in two-dimensional space. Additionally, the handles 118 of the animation object each include parameters that define a handle rotation and a handle translation of a respective handle in the two-dimensional space. Similarly, the animation object 516 includes the handles 518 that are each selectable for setting one or more of the animation constraints 520 on an object region of the animation object 516, as shown and described with reference to FIG. 5.

At 604, a first user input is received designating a particular handle or handles with the animation constraints for the object regions of the animation object in a keyframe. For example, the animation simulator 512 receives the animation inputs 524 (e.g., as user inputs) on handle controls of one or more designated handles 518, and sets the animation constraints 520 for the associated object region or regions of the animation object 516 in keyframes of an animation sequence that includes multiple frames of the animation object. An animator can designate a particular handle or handles with the animation constraints for an object region or regions associated with the one or more handles, and based on the user input, the animation simulator 512 sets the animation constraints on the particular handle or handles for the object region or regions of the animation object 516 that are associated with the particular handle or handles. The animation inputs 524 on a particular handle or handles 518 can be partial keyframing inputs to set the animation constraints 520 as a handle rotation and/or handle translation on a handle 518 of an associated object region of the animation object 516. An animation input 524 to a particular handle 518 can be received by the animation simulator 512 to animate a feature of the animation object 516 effective to extend the feature beyond physical limitations (e.g., for a cartoonish-like animation).

At 606, a second user input on the particular handle or handles is received, designating a timing of the animation object through multiple frames in the animation sequence.

For example, the animation simulator 512 can also receive the animation inputs 524 (e.g., the user inputs) for the animation object 516 to designate a timing of the animation object through the multiple frames in an animation sequence.

At 608, a simulation of the animation object is projected utilizing the projected dynamics algorithm that applies physics to simulate the object regions of the animation object in the animation sequence, where the simulation includes simulating the object region or regions associated with the particular handle or handles based on the timing and the animation constraint. For example, the animation simulator 512 utilizes the projected dynamics algorithm 514 that applies physics to the handles 518 of the animation object 516 to project the simulation (e.g., a forward-simulation over time) of the animation object based on the designated timing and the one or more animation constraints 520 set on the particular handle or handles of the animation object. In implementations, the simulation of the animation object 516 projects an update for each of the handles 518, and the animation simulator moves the portion of the mesh that corresponds to the object region in the set of object regions based on the projected update for each of the handles.

At 610, an animation sequence in a simulation of the animation object is generated based on the projected simulation. For example, the animation simulator 512 generates the animation sequence 526 in the simulation of the animation object 516 based on the simulation of the animation object utilizing the projected dynamics algorithm 514 that applies physics to the handles 518 of the animation object. A feature of the animation object can be animated by extending the feature beyond physical limitations based on the animation constraints for the constrained or particular handle or handles, and the non-designated handles of the animation object are simulated utilizing the projected dynamics within physical limitations to generate the animation simulation of the animation object.

Figure 7:
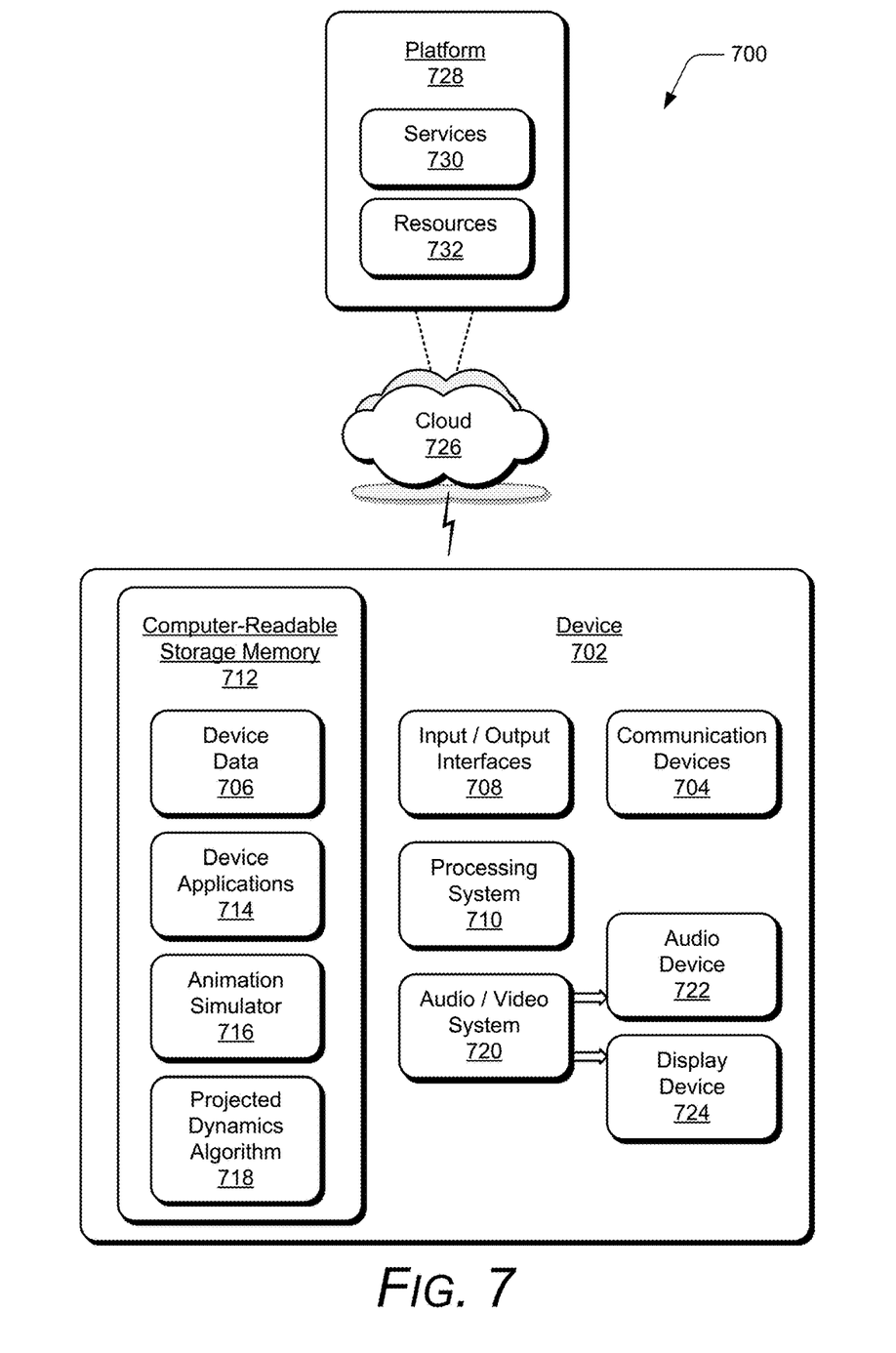
FIG. 7 illustrates an example system with an example device that can implement embodiments of animation using keyframing and projected dynamics simulation.

FIG. 7 illustrates an example system 700 that includes an example device 702, which can implement embodiments of animation using keyframing and projected dynamics simulation. The example device 702 can be implemented as any of the computing devices and/or services (e.g., server devices) described with reference to the previous FIGS. 1-6, such as any type of computing device, client device, mobile phone, tablet, communication, entertainment, gaming, media playback, and/or other type of device. For example, the tablet device 102, the computing device 502, and/or server devices of the cloud-based animation service 528 may be implemented as the example device 702.

The device 702 includes communication devices 704 that enable wired and/or wireless communication of device data 706, such as animation object data, parameters of the handles on an animation object, animation constraints, animation inputs, and computer applications content that is maintained and/or processed by computing devices. The device data can include any type of audio, video, image, and/or graphic data that is generated by applications executing on the device. The communication devices 704 can also include transceivers for cellular phone communication and/or for network data communication.

The device 702 also includes input/output (I/O) interfaces 708, such as data network interfaces that provide connection and/or communication links between the example device 702, data networks, and other devices. The I/O interfaces can be used to couple the device to any type of components, peripherals, and/or accessory devices, such as a digital camera device that may be integrated with device 702. The I/O interfaces also include data input ports via which any type of data, media content, and/or inputs can be received, such as user inputs to the device, as well as any type of audio, video, image, and/or graphic data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage memory 712, such as data storage devices that can be accessed by a computing device, and that provide persistent storage of data and executable instructions (e.g., software applications, modules, programs, functions, and the like). The computer-readable storage memory 712 described herein excludes propagating signals. Examples of computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. In this example, the device applications also include an animation simulator 716 that implements embodiments of animation using keyframing and projected dynamics simulation utilizing a projected dynamics algorithm 718, such as when the example device 702 is implemented as the computing device 502 shown and described with reference to FIG. 5. Examples of the animation simulator 716 and the projected dynamics algorithm 718 include the animation simulator 512 and the projected dynamics algorithm 514 that are implemented by the computing device 502 and/or by the cloud-based animation service 528, as shown and described with reference to FIG. 5.

The device 702 also includes an audio and/or video system 720 that generates audio data for an audio device 722 and/or generates display data for a display device 724. The audio device and/or the display device include any devices that process, display, and/or otherwise render audio, video, display, and/or image data, such as the image content of an animation object. In implementations, the audio device and/or the display device are integrated components of the example device 702. Alternatively, the audio device and/or the display device are external, peripheral components to the example device. In embodiments, at least part of the techniques described for animation using keyframing and projected dynamics simulation may be implemented in a distributed system, such as over a "cloud" 726 in a platform 728. The cloud 726 includes and/or is representative of the platform 728 for services 730 and/or resources 732. For example, the services 730 may include the cloud-based animation service shown and described with reference to FIG. 5.

The platform 728 abstracts underlying functionality of hardware, such as server devices (e.g., included in the services 730) and/or software resources (e.g., included as the resources 732), and connects the example device 702 with other devices, servers, etc. The resources 732 may also include applications and/or data that can be utilized while computer processing is executed on servers that are remote from the example device 702. Additionally, the services 730 and/or the resources 732 may facilitate subscriber network services, such as over the Internet, a cellular network, or Wi-Fi network. The platform 728 may also serve to abstract and scale resources to service a demand for the resources 732 that are implemented via the platform, such as in an interconnected device embodiment with functionality distributed throughout the system 700. For example, the functionality may be implemented in part at the example device 702 as well as via the platform 728 that abstracts the functionality of the cloud 726.

Although embodiments of animation using keyframing and projected dynamics simulation have been described in language specific to features and/or methods, the appended claims are not necessarily limited to the specific features or methods described. Rather, the specific features and methods are disclosed as example implementations of animation using keyframing and projected dynamics simulation, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of animating an animation object having a set of multiple connected object regions within the animation object by combining keyframing with simulation that utilizes projected dynamics, the method comprising:
   displaying handles associated with the set of multiple connected object regions within the animation object, at least two of the multiple connected object regions comprising a handle selectable for setting one or more animation constraints on the respective object region, the at least two of the multiple connected object regions each independently selectable with the respective handle to set at least one of the animation constraints for the respective object region of the animation object;
   receiving a first user input designating a particular handle with at least one of the animation constraints, the first user input received in a keyframe of an animation sequence that includes multiple frames of the animation object;
   based on the first user input, setting the at least one animation constraint on the particular handle for the object region associated with the particular handle; and
   projecting a simulation of the animation object utilizing a projected dynamics algorithm that applies physics to simulate the set of multiple connected object regions of the animation object in the animation sequence, the simulation including simulating the object region of the animation object associated with the particular handle based on the at least one animation constraint.

2. The method as recited in claim 1, wherein the first user input designating the particular handle is a partial keyframing input in the keyframe of the animation sequence.

3. The method as recited in claim 1, further comprising:
   receiving a second user input for the particular handle, the second user input designating a timing of the object region associated with the particular handle of the animation object through the multiple frames in the animation sequence; and
   generating the animation sequence of the animation object by said projecting the simulation of the animation object utilizing the projected dynamics algorithm that applies the physics to simulate the set of multiple connected object regions of the animation object, the simulation including simulating the object region of the animation object associated with the particular handle based on the timing and the at least one animation constraint.

4. The method as recited in claim 1, wherein said projecting the simulation of the animation object includes the projected dynamics algorithm applying the at least one animation constraint to the object region associated with the particular handle as a physics force over time.

5. The method as recited in claim 1, further comprising:
   receiving a second user input designating multiples ones of the handles with the at least one animation constraint;
   based on the second user input, setting the at least one animation constraint on the multiple handles for the respective object regions associated with the multiple handles; and wherein
   said projecting the simulation of the animation object includes simulating the respective object regions associated with the multiple handles based on the at least one animation constraint.

6. The method as recited in claim 1, wherein each of the object regions in the set of multiple connected object regions is modeled as a portion of a mesh that defines the animation object in a two dimensional space.

7. The method as recited in claim 6, wherein said projecting the simulation of the animation object includes generating a projected update for each handle of the handles, and the method further comprising:
   moving the portion of the mesh that corresponds to the object region in the set of multiple connected object regions based on the projected update for each handle of the handles.

8. The method as recited in claim 1, wherein:
   the handles of the animation object each includes parameters that define a handle rotation and a handle translation in two-dimensional space; and
   said setting the at least one animation constraint on the particular handle for the object region associated with the particular handle comprises configuring the handle rotation and the handle translation of the particular handle.

9. The method as recited in claim 1, further comprising:
   animating a feature of the animation object by extending the feature beyond physical limitations based on the first user input designating the particular handle with the at least one animation constraint.

10. A computing device implemented for animation combining keyframing with simulation that utilizes projected dynamics, the computing device comprising:
    a memory device configured to maintain parameters that define handles associated with a set of multiple connected object regions within an animation object, at least two of the multiple connected object regions comprising a handle selectable for setting one or more animation constraints on the respective object region, the at least two of the multiple connected object regions each independently selectable with the respective handle to set at least one of the animation constraints for the respective object region of the animation object;

a processor system to execute an animation simulator as a computer application, the animation simulator configured to:

receive a first user input designating a particular handle with at least one of the animation constraints, the first user input received in a keyframe of an animation sequence that includes multiple frames of the animation object;

based on the first user input, set the at least one animation constraint on the particular handle for the object region associated with the particular handle;

project a simulation of the animation object utilizing a projected dynamics algorithm that applies physics to simulate the set of multiple connected object regions of the animation object in the animation sequence, the simulation including simulating the object region of the animation object associated with the particular handle based on the at least one animation constraint; and generate the animation sequence of the animation object based on the projected simulation of the animation object.

11. The computing device as recited in claim 10, wherein:
the first user input designating the particular handle is a partial keyframing input in the keyframe of the animation sequence; and
the animation simulator is configured to said set the at least one animation constraint on the particular handle for the object region associated with the particular handle of the animation object in the keyframe based on the partial keyframing input.

12. The computing device as recited in claim 10, wherein the animation simulator configured to:
receive a second user input designating multiples ones of the handles with the at least one animation constraint;
based on the second user input, set the at least one animation constraint on the multiple handles for the respective object regions associated with the multiple handles; and
wherein to project the simulation of the animation object includes the animation simulator configured to simulate the respective object regions associated with the multiple handles based on the at least one animation constraint.

13. The computing device as recited in claim 10, wherein the animation simulator is configured to receive a second user input for the particular handle, the second user input designating a timing of the object region associated with the particular handle of the animation object through the multiple frames in the animation sequence.

14. The computing device as recited in claim 13, wherein the animation simulator is configured to project the simulation of the animation object including the animation simulator configured to simulate the object region associated with the particular handle based on the timing.

15. The computing device as recited in claim 10, wherein:
each of the object regions in the set of multiple connected object regions is modeled as a portion of a mesh that defines the animation object in a two-dimensional space; and the animation simulator is configured to:
generate a projected update for each handle of the handles to project the simulation of the animation object; and
move the portion of the mesh that corresponds to the object region in the set of multiple connected object regions based on the projected update for each handle of the handles.

16. The computing device as recited in claim 10, wherein:
the parameters that define the handles of the animation object define a handle rotation and a handle translation in two-dimensional space for each of the handles; and
the animation simulator is configured to set the at least one animation constraint on the particular handle as the handle rotation and the handle translation of the particular handle.

17. The computing device as recited in claim 10, wherein the animation simulator is configured to:
animate a feature of the animation object by extending the feature beyond physical limitations based on the first user input designating the particular handle with the at least one animation constraint.

18. A method for animation using keyframing and projected dynamics simulation, the method comprising:
displaying handles over a mesh that defines an animation object, the handles associated with a set of multiple connected object regions each corresponding to a portion of the mesh that defines the animation object, at least two of the multiple connected object regions comprising a handle selectable for setting one or more animation constraints on the respective object region, the at least two of the multiple connected object regions each independently selectable with the respective handle to set at least one of the animation constraints for the respective object region of the animation object;
receiving a first user input designating multiple ones of the handles with at least one of the animation constraints, the user input received in a keyframe of an animation sequence that includes multiple frames of the animation object;
based on the first user input, setting the at least one animation constraint on the multiple handles for the respective object regions associated with the multiple handles;
projecting a simulation of the animation object utilizing a projected dynamics algorithm that applies physics to simulate the set of multiple connected object regions on the animation object in the animation sequence, the simulation including simulating the respective object regions of the animation object associated with the multiple handles based on the at least one animation constraint; and
generating the animation sequence of the animation object based on the projected simulation of the animation object.

19. The method as recited in claim 18, wherein the first user input designating the multiple handles is a partial keyframing input in the keyframe of the animation sequence.

20. The method as recited in claim 18, further comprising:
receiving a second user input for the multiple handles, the second user input designating a timing of the respective object regions associated with the multiple handles of the animation object through the multiple frames in the animation sequence; and
said projecting the simulation of the animation object includes simulating the respective object regions associated with the multiple handles based on the timing.

* * * * *